Feb. 8, 1949.  A. E. MILLER ET AL  2,461,500
APPARATUS FOR CONSTRUCTING VIBRATION-COMPACTED
CONCRETE SLABS
Filed Oct. 4, 1944   5 Sheets-Sheet 1

Inventors
Arthur E. Miller,
George K. Viall and
Rudolph F. Lindow,

Attorney

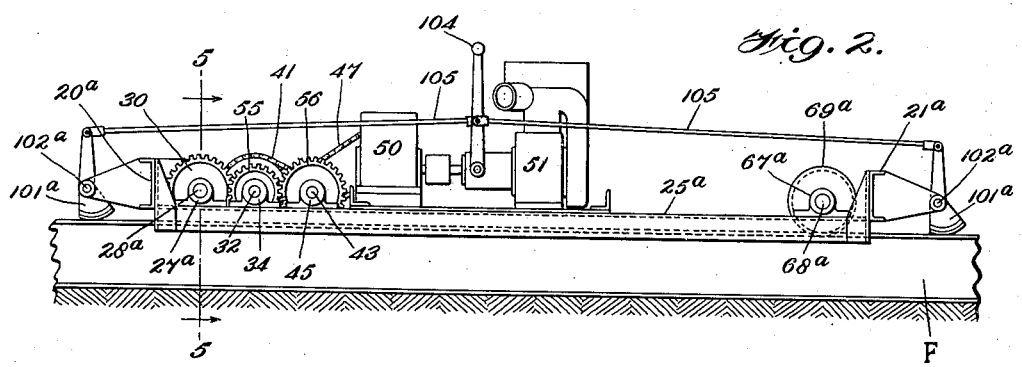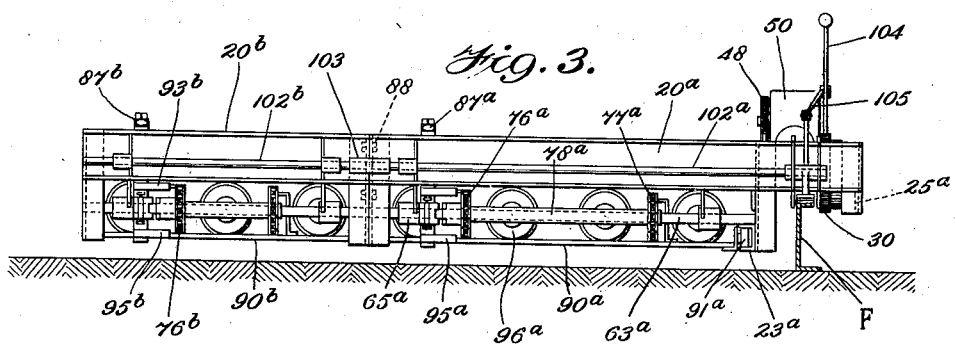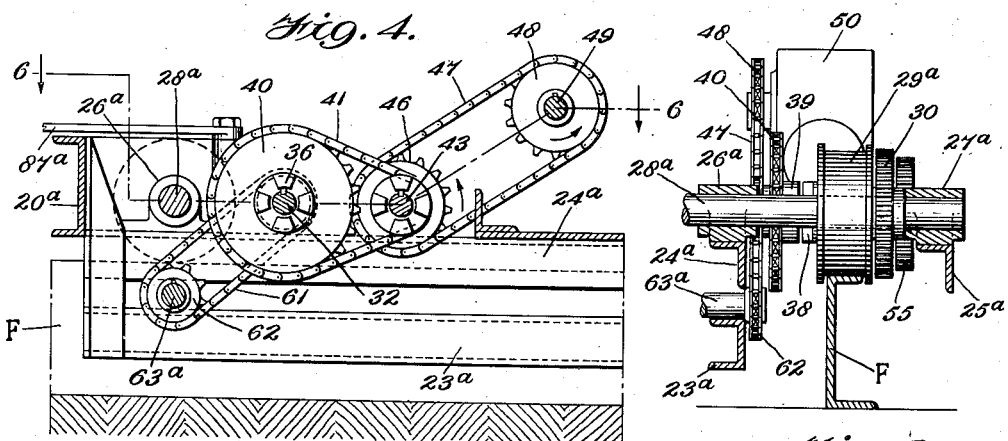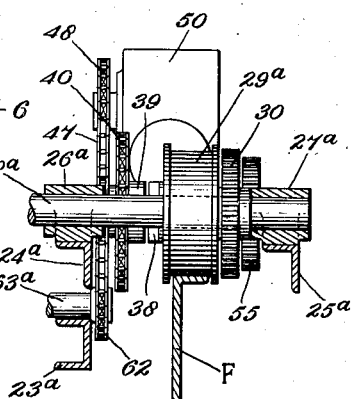

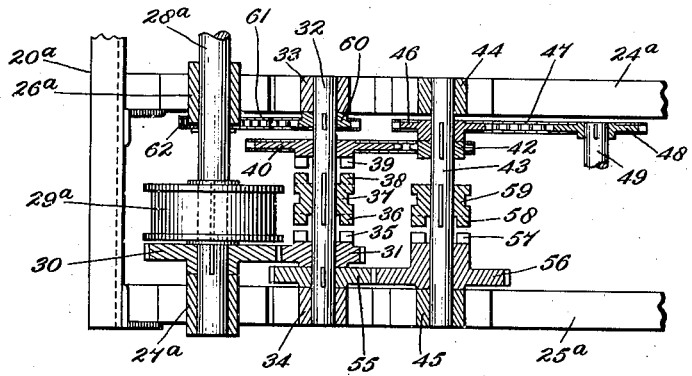
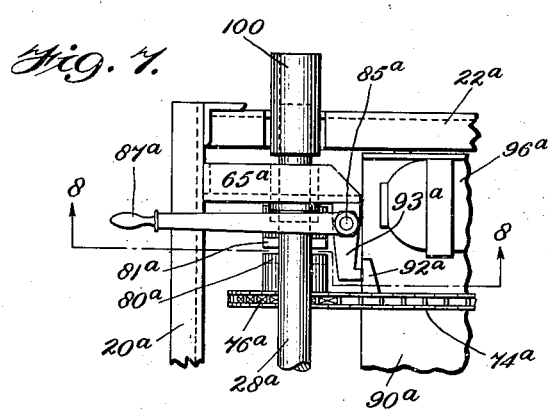
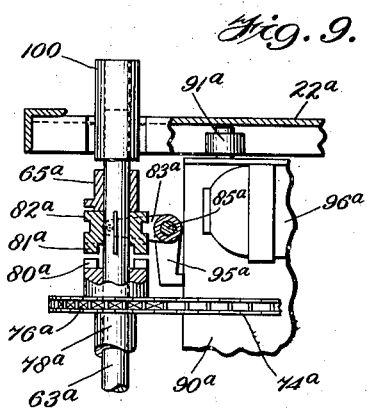
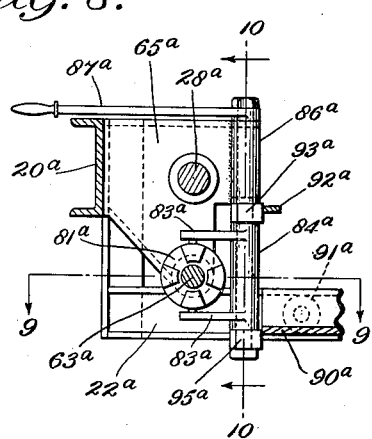
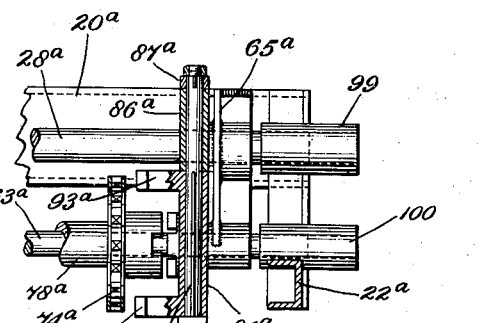

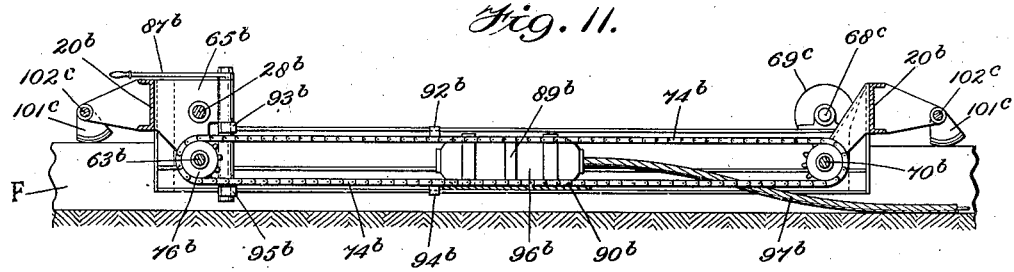
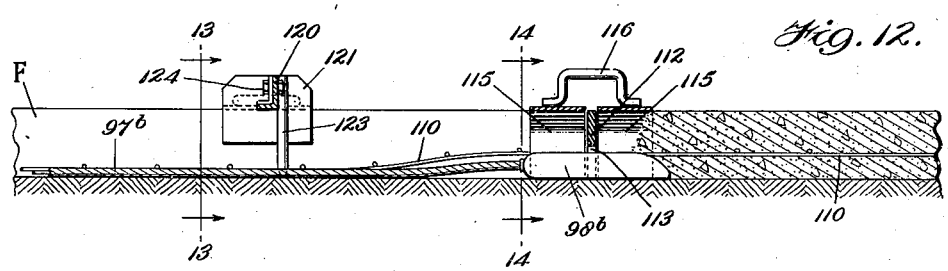
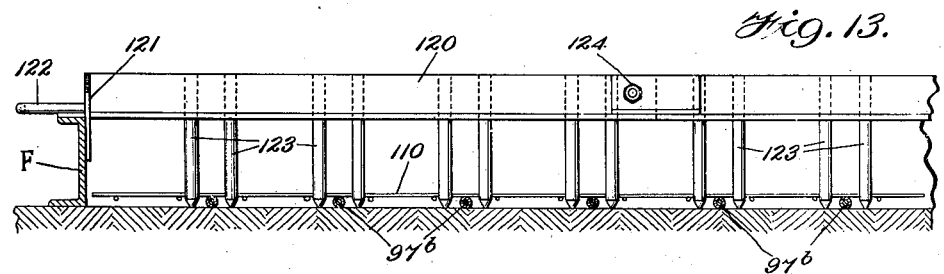
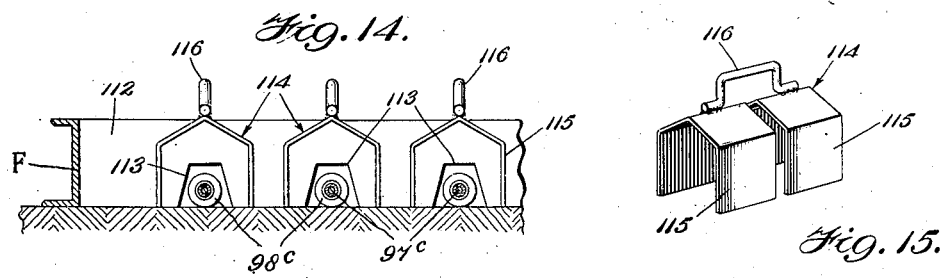
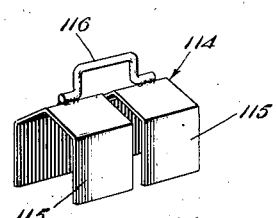
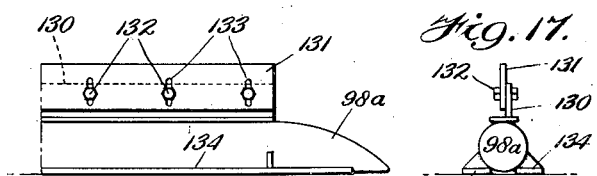
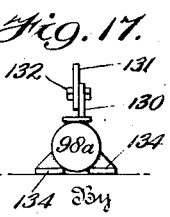
Inventors
Arthur E. Miller,
George K. Viall and
Rudolph F. Lindow,
Attorney Patented Feb. 8, 1949

2,461,500

UNITED STATES PATENT OFFICE 2,461,500

APPARATUS FOR CONSTRUCTING VIBRATION-COMPACTED CONCRETE SLABS

Arthur E. Miller and George K. Viall, Milwaukee, and Rudolph F. Lindow, Wauwatosa, Wis., assignors to Chain Belt Company, Milwaukee, Wis., a corporation of Wisconsin Application October 4, 1944, Serial No. 557,162

10 Claims. (Cl. 94—48)

The invention relates to the construction of concrete slabs, and has for its principal object the provision of an improved apparatus for constructing reinforced vibration-compacted concrete road slabs having expansion joints between adjacent sections.

While susceptible of various embodiments within the scope of the invention, for purposes of disclosure there has been illustrated in the accompanying drawings forming a part of this specification one form of apparatus constructed and arranged in accordance with the invention.

In the said drawings:

Figs. 1 and 1A together constitute a plan view of such form of apparatus;

Fig. 2 is a side elevational view of the parts illustrated in Fig. 1;

Fig. 3 is a partial front elevational view of the apparatus shown in Figs. 1 and 2, as seen from the left of the said figures;

Fig. 4 is an enlarged sectional-elevational view of a portion of the drive mechanism of the machine, taken approximately on the planes indicated by the line 4—4 of Fig. 1, looking in the direction of the arrows;

Fig. 5 is an enlarged fragmentary cross-sectional view, taken on the plane indicated by the line 5—5 of Fig. 2;

Fig. 6 is a sectional-plan view, taken on the planes indicated by the line 6—6 of Fig. 4, looking down;

Fig. 7 is a fragmentary detail plan view of a portion of the mechanism for effecting and controlling longitudinal movements of one of the vibrator batteries;

Fig. 8 is a sectional-elevational view on approximately the planes indicated by the line 8—8 of Fig. 7, looking in the direction of the arrows;

Fig. 9 is a sectional-plan view, on the plane indicated by the line 9—9 of Fig. 8, looking down;

Fig. 10 is a vertical sectional-elevational view, on the plane indicated by the line 10—10 of Fig. 8, looking in the direction of the arrows;

Fig. 11 is a longitudinal sectional-elevational view of the apparatus shown in Fig. 1, taken on the plane indicated by the line 11—11 of said figure, looking in the direction of the arrows;

Fig. 12 is a view similar to Fig. 11, taken on the plane indicated by the line 12—12 of Fig. 1A;

Figs. 13 and 14 are enlarged fragmentary sectional-elevational views, taken upon the planes indicated by the respective lines 13—13 and 14—14 of Fig. 12, looking in the direction of the arrows;

Fig. 15 is a detail perspective view of one of the elements employed at the expansion joints in the pavement to facilitate passage of the vibrating devices through the joints;

Fig. 16 is a fragmentary side elevational view of a vibrating device provided with one form of adjustable means whereby a reinforcing mesh or other element may be positioned for incorporation into the slab at various distances below the upper surface of the latter, or above the sub-grade; and Fig. 17 is an end view of the parts shown in Fig. 16.

Figure 1:
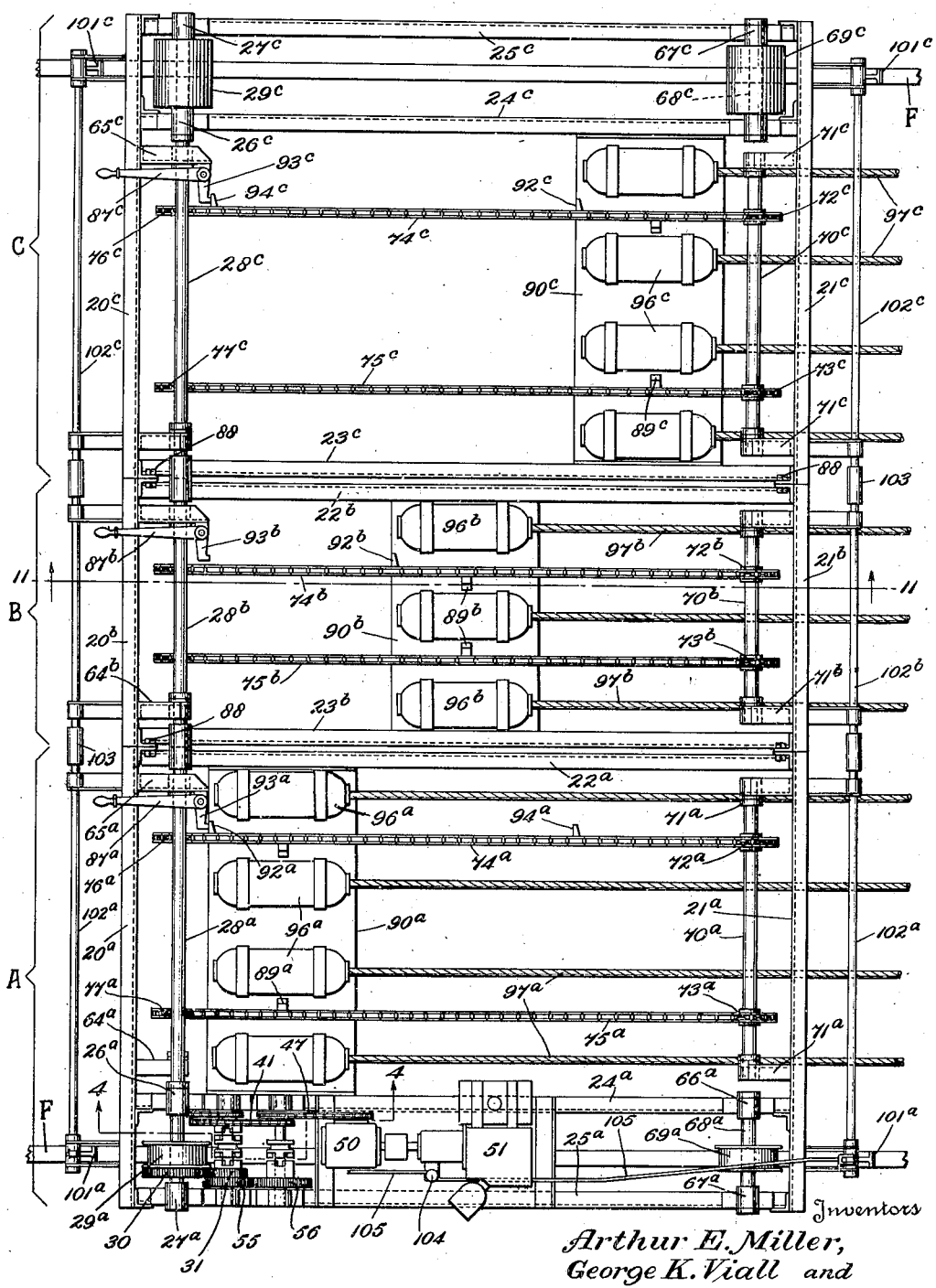

The present apparatus is designed to be supported by and to travel upon the forms or rails F which are customarily laid upon a prepared sub-grade to define the lateral edges of the concrete road slab, and in order that the apparatus may be readily accompanied to the construction of slabs of different widths, it is preferably composed of a plurality of separably connected units such as A, B and C (Fig. 1). For a road of less width than that indicated in said figure, a unit similar to but of less width than the intermediate unit B may be substituted for such unit, or the said unit may be removed completely and the units A and C directly connected together, while for roads of greater width than that indicated, a B unit of greater width may be substituted for the one shown, or a second B unit may be introduced into the machine, all as will be readily understood.

The unit A comprises a rectangular frame which includes end members 20a and 21a and longitudinal members 22a, 23a, 24a and 25a rigidly connected thereto. At their forward end the longitudinals 24a and 25a respectively carry suitable bearings 26a and 27a in which is journalled a transversely extending shaft 28a which rigidly carries a flanged supporting wheel 29a and a gear 30. As best shown in Fig. 6, the said gear meshes with a companion gear 31 which is loosely mounted upon a countershaft 32 journalled in bearings 33 and 34 carried by the longitudinals 24a and 25a respectively. The said gear 31 is provided with clutch jaws 35 which are adapted to be engaged by companion clutch jaws 36 formed on one end of a shiftable clutch member 37 which is splined on the countershaft 32. The other end of said clutch member 37 is provided with clutch jaws 38 which are engageable with companion clutch jaws 39 carried by a sprocket 40 which is loosely mounted on the countershaft 32. A drive chain 41 is trained about the sprocket 40 and about a companion sprocket 42 which is rigidly carried by a jack shaft 43 journalled in bearings 44 and 45 carried by the longitudinal members 24a and 25a. The said jack shaft also rigidly carries a sprocket 46 which is driven by a chain 47 from a sprocket 48 carried by the output shaft 49 of a reducing gear mechanism 50, which is driven from any suitable source of power such, for example, as an internal combustion engine 51 mounted upon the longitudinal frame members 24a, and 25a, see Figs. 1 and 2.

The countershaft 32 also rigidly carries a gear 55 which meshes with a companion gear 56, loosely mounted on the jack shaft 43 and provided with a jaw clutch element 57 adapted to be engaged by a companion clutch element 58 formed on a shiftable clutch member 59 which is splined on the jack shaft 43.

The countershaft 32 has a sprocket 60 keyed to it which, through a chain 61, drives a sprocket 62 rigidly carried by a transverse shaft 63a journalled in bearing brackets 64a and 65a carried by the transverse frame member 20a. The bracket 65a also journals the shaft 28a, as will be clear from Figs. 8 and 10.

At the rear end of the framework, adjacent the transverse member 21a, the longitudinals 24a and 25a carry bearings 66a and 67a which journal a shaft 68a carrying a flanged roller 69a. This roller and its companion forward roller 29a constitute a pair of supporting wheels for the frame, which are adapted to rest upon and traverse one of the forms or rails F, as will be readily understood from Figs. 1, 2 and 5. A shaft 70a is also mounted at this end of the framework, being journalled in bearing brackets 71a carried by the frame member 21a. This shaft carries a pair of transversely spaced sprockets 72a and 73a, about which chains 74a and 75a are trained. These chains extend forwardly to and about sprockets 76a and 77a carried by a sleeve 78a which is loosely mounted on the shaft 63a. As best shown in Figs. 7–10, the sprocket 76a is provided with clutch jaws 80a which are engageable by companion clutch jaws 81a formed on a shiftable clutch member 82a which is splined on the shaft 63a. The member 82a is shiftable on the said shaft to engage and disengage the clutch elements 80a and 81a by means of a pair of arms 83a carried by a sleeve 84a which is keyed to a spindle 85a which is journalled in a vertical bearing sleeve 86a which is part of the bearing bracket structure 65a. At its top the spindle 85a rigidly carries an operating arm 87a by means of which the spindle may be moved to shift the clutch element 81a into engagement with the companion element 80a, whereby the sprockets 76a, and 77a and their chains 74a and 75a may be driven from the shaft 63a.

The longitudinal members 22a and 23a of the frame constitute supporting guides or trackways for a carriage 90a which is mounted thereon by rollers 91a (Figs. 8 and 9). The said carriage is attached to the upper run of the chains 74a and 75a as by brackets 89a and thus is traversable along the members 22a and 23a longitudinally of the frame when the said chains are driven from the shaft 63a, as above explained. To prevent over-travel of the carriage in the forward direction the upper run of the chain 74a is provided with a knock-out dog 92a which, when the carriages reaches substantially the position illustrated in Figs. 1, 7 and 8, engages and moves an arm 93a carried by the sleeve 84a whereby the latter, through its shifting arms 83a, disengages the clutch elements 80a, 81a to break the drive to the chains 74a, 75a. In like manner, the lower run of the chain 74a carries a knock-out dog 94a which is engageable with an arm 95a of the sleeve 84a to cause disengagement of the clutch when the carriage reaches its rearward limit of travel.

Mounted upon the carriage 90a is a battery of motive units 96a, such for example as electric motors, each of which is connected by an armored flexible shafting 97a to a vibrating mechanism 98a, of any suitable construction. The shafts 97a are of such length that the vibrators 98a may trail behind the machine by say 10 to 20 feet.

Except that it has no prime mover and drive gearing, the construction of the the unit C of the machine is much the same as that of the A unit just described; and the elements of the former unit which correspond to those of the latter are designated by like reference numerals with c exponents. The C unit also differs from the A unit in that its rollers 29c and 69c, instead of being relatively narrow and flanged as are the rollers 29a and 69a, are preferably relatively wide and unflanged, as clearly shown in Fig. 1. This will enable the apparatus to move freely along the forms F even though the latter may not be absolutely parallel at all points.

The intermediate B unit is also largely similar to the A unit, except that it has no drive mechanism and supporting rolls; and its corresponding parts are designated by like reference numerals with b exponents. As will be readily understood from Figs. 1 and 3, the B unit is disposed between the A and C units, to which it is rigidly but separably attached by connections such as the bolts 88. The alined shafts 28a, 28b and 28c are connected at their joints by suitable shaft couplings 99, while the shafts 63a, 63b and 63c are connected by similar couplings 100, one of which is shown in Figs. 9 and 10.

It is contemplated that the machine will be moved only intermittently on the forms F, and to hold it stationary between movements the units A and C are provided with eccentric brake shoes 101a and 101c carried by shafts 102a and 102c and engageable with the respective forms F in front of and behind the machine, as shown in Fig. 2. The shafts 102a, 102b and 102c are connected by shaft couplings 103 so that all four brake shoes may be simultaneously operated by a lever 104 through rods 105 connected to the shoes 101a.

As is well known, under present practice the concrete mixture for a large percentage of the concrete roads constructed today is furnished by a specialized type of concrete mixer known as a "paver" which is advanced intermittently on the subgrade between the forms F, and is provided with a distributing bucket travelling upon a rearwardly extending horizontally oscillatable boom, by means of which the mixture is conveyed from the mixing drum and deposited on the sub-grade. The present machine is low enough that when mounted upon the forms F, as shown in Figs. 2, 3 and 11, it may be positioned directly behind the paver, beneath the boom thereof, without interfering with the travel of the distributing bucket on such boom. Thus the mixture from the paver drum may be conveyed by the bucket to the rear of the vibrating machine and deposited on the road bed to fill the space between the forms F and cover the vibrators 98a, 98b and 98c, and upon the latter being actuated by their motive units 96a, 96b and 96c the plastic mixture will be subjected to internal vibration which compacts and densifies it in a manner well understood by those skilled in the art.

At the beginning of a cycle of operation, with the vibrating machine in place upon the forms F behind the paver, its several clutches disengaged, and longitudinal movement on the forms restrained by setting of the brakes 101a, 101c, the several carriages 90a, 90b and 90c are all moved to their rearmost position, i.e. the position in which the carirage 90c is illustrated in Fig. 1, and the several vibrators 98a, etc. are disposed upon the road bed as far to the rear of the machine as is permitted by the length of the flexible shafts 97a, etc. Concrete from the paver is then deposited by its distributing bucket in the area occupied by the vibrators and the latter are operated by their motive units 96a, etc. to compact and densify the mixture by their internally applied vibrations. As the deposit of concrete progresses the vibrators are slowly drawn forwardly through the mixture in the following manner:

Referring more particularly to Figs. 4 and 6, if the output shaft 49 of the gear mechanism 50 be rotating in a counterclockwise direction, as viewed in Fig. 4, the chain 47 will drive the jack shaft 43 in like direction and the sprocket 40 (loose on countershaft 32) in turn will be similarly driven by the chain 41. If now the shiftable clutch member 37 be moved to engage the clutch elements 38 and 39, the countershaft 32 will also be driven counterclockwise, which motion will be transmitted through sprocket 60, chain 61 and sprocket 62 to the transverse shafts 63a, 63b and 63c. Upon shifting of one or more of the levers such as 87a the clutch elements such as 80a, 81a, controlled thereby will be engaged and the motion of the shafts such as 63a will be transmitted to their associated sprockets such as 76a, 77a thereby causing the chains such as 74a, 75a to move the carriages 90a etc. from right to left, as viewed in Figs. 1 and 11, and thus draw the vibrators 98a etc. forwardly.

This forward motion of the carriages and vibrators may be interrupted at any desired point by manual disengagement of the clutches 80a, 81a etc. by means of their control levers such as 87a, but if permitted to continue until the carriage reaches the position of carriage 90a in Fig. 1, the motion will be automatically discontinued at this point by reason of the engagement of the dog such as 92a with the arm such as 93a which will cause the shifting fork 83a to move the clutch member 82a to disengaged position, thus breaking the drive from shaft 63a.

The carriage motion may also be reversed, by reversing the direction of rotation of the shafts 63a etc., which may be accomplished by moving the clutch member 37 to neutral, as shown in Fig. 6, and then moving the clutch member 59 to engage the jaws 57 and 58. The direction of rotation of the countershaft 32 and consequently of the shaft 63a will now be clockwise, since the drive from the jack shaft 43 to the countershaft 32 is now through the intermeshing gears 55 and 56. Ordinarily this reversed drive of the carriages will be employed only while bodily advancing the machine to a new position on the forms F, its purpose being to maintain the vibrators 98a etc. relatively stationary on the sub-grade during such advance. The reverse motion of the carriages will also be automatically discontinued when they reach the position relative to the frame in which the carriage 90c is illustrated, since at this time the dog such as 94a carried by the lower run of the chain 74a will engage the arm 95a of the clutch shifting mechanism and disengage the clutch elements such as 80a, 81a.

When the paver is moved forwardly to a new position on the sub-grade the present machine may be advanced along the forms to keep pace therewith if, with the clutch elements 57 and 58 in engagement, the clutch member 37 is shifted to engage the jaws 35 and 36, which will result in counterclockwise rotation of the shafts 28a, etc. and the supporting wheels 29a and 29c carried thereby, from the now clockwise rotating countershaft 32 through the gears 30 and 31. To prevent the possibility of inadvertent simultaneous oppositely directioned drives to the countershaft 32, through the chain and sprocket drive 40, 41, 42 on the one hand and the gears 55 and 56 on the other, the clutch members 37 and 59 may be provided with any appropriate form of interlock to make it impossible to engage the clutch jaws 38 and 39 when the clutch elements 57 and 58 are engaged.

As is well known, it is the present day practice to reinforce most concrete road slabs with steel mesh fabric which is incorporated into them in the course of construction; and it is also known that bonding of the concrete to the fabric is facilitated if vibration be imparted to the fabric as the concrete is being deposited upon and worked through and around the same. The present apparatus is of value in this connection, as will be understood from Figs. 1A, 12 and 13, wherein suitable lengths of such fabric 110 are shown as deposited between the forms F, resting upon the flexible shafts 97a etc. and the vibrators 98a etc. When the latter are operated their vibrations of course will be transmitted to the fabric strands; and as the vibrators are drawn along the subgrade they will elevate the fabric above the subgrade so that it will become incorporated in the slab at an appropriate distance between the upper and lower surfaces of the slab.

Figure 1A:
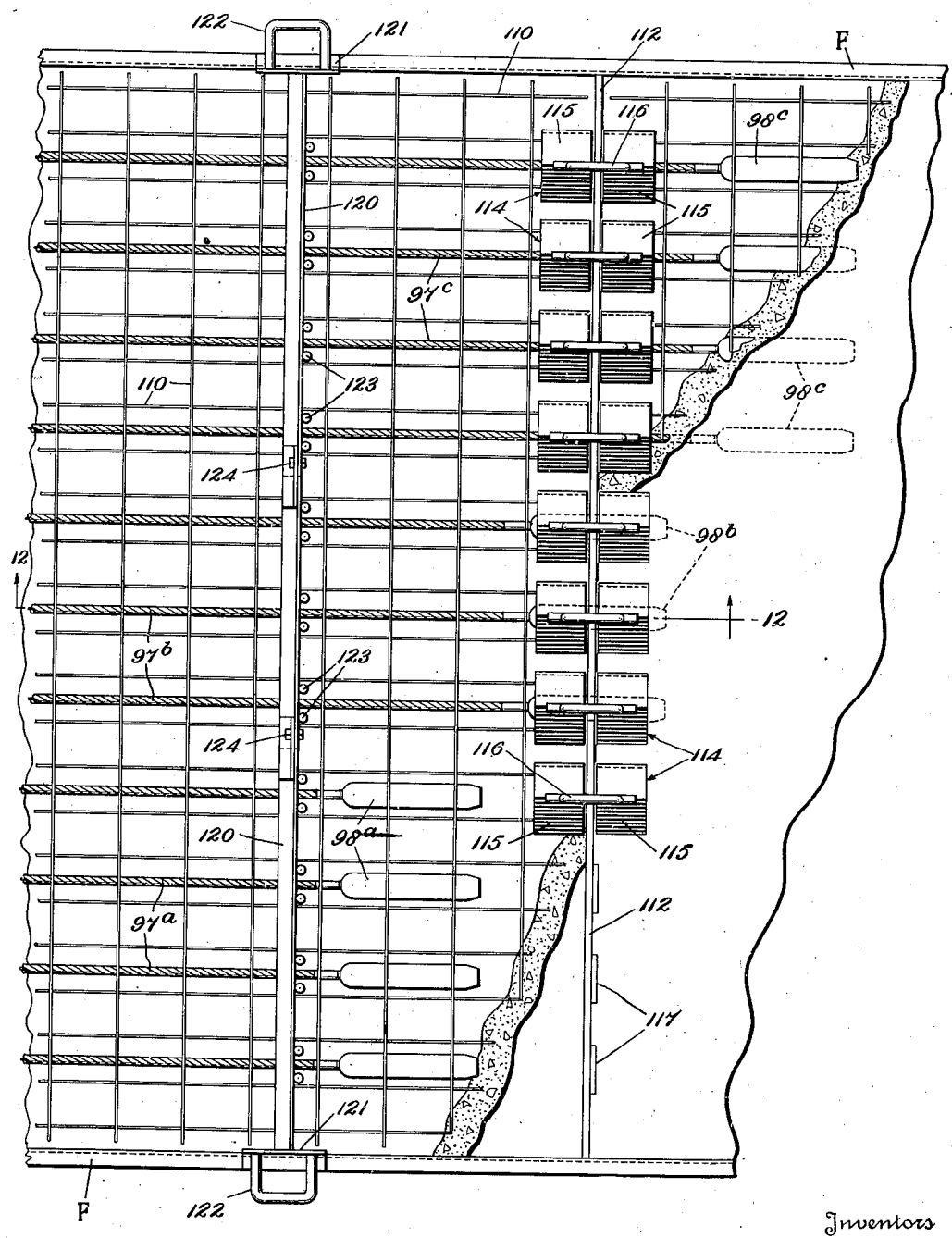

It is also common practice to provide expansion joints in the roadway, usually by incorporating strips of compressible material in the concrete at suitable intervals. These strips ordinarily extend from top to bottom of the slab and since they must be set in place transversely of the road bed in advance of the vibrators, provision must be made for drawing the latter and their flexible shafts through the joint strips. One such strip is illustrated in Figs. 1A, 12 and 14 at 112, and as will be clear therefrom the lower portion of the strip is provided with a plurality of spaced openings or notches 113 through which the flexible shafts 97a etc. may initially extend, and through which the vibrators themselves may be drawn when advanced as above described, as shown in Fig. 12. To prevent the concrete mixture from working into such openings, whereby it might interfere with the passage of the vibrators through the openings and might also form a continuous concrete bridge of the joint with the next slab section, the openings are each preferably temporarily protected by shielding devices 114. These, as will be clear from Figs. 1A, 12, 14 and 15, comprise a pair of tunnel-like elements 115 which are maintained in alined spaced relation by a bridge member 116 welded to them and which may also serve as a handle for manipulating the device. As will be readily understood, one of these shielding devices is straddled over the joint strip at each opening 113 therein and as best indicated in Fig. 12 prevents the concrete from reaching such opening. After the vibrators have been drawn through the openings, the shields 114 are lifted out and small pieces 117 of the joint material (Fig. 1A) are placed in position to cover the openings 113, after which the small voids left by the shields may be filled with concrete by hand.

To maintain the vibrator shafts and vibrators in proper transversely spaced relation, one or more guide structures may be employed between the machine and the vibrators. One of these devices is shown in Figs. 1A, 12 and 13 as comprising an angle iron member 120 provided at its ends with rests 121 for supporting it upon the forms F, and with handles 122 by which it may be manipulated. This member rigidly carries a plurality of pairs of rods or fingers 123 which extend downwardly to the sub-grade. The fingers are so spaced that when the member 120 is placed in position on the forms to span the sub-grade the pairs of fingers will act as guides for the several flexible shafts 97a etc. to prevent lateral displacement of the latter as they are drawn along the sub-grade. This guide device of course is removed from the forms as the deposit of concrete reaches its vicinity; and it is preferably constructed as a plurality of units separably connected as at 124 and corresponding to the units A, B and C of the machine, so that it may be accommodated to roads of various widths.

In order that the distance above the sub-grade at which the reinforcing mesh 110 is positioned in the slab may be varied to suit different conditions or specifications, the vibrating devices 98a, 98b, 98c may be provided with adjustable supporting means for the mesh, as shown in Figs. 16 and 17. That is to say, the housings of the said vibrating devices may have rigidly secured to them a longitudinally extending angle bracket 130, to the upstanding leg of which a mesh-supporting strip or plate 131 is adjustably secured by bolts 132 carried by the bracket and passing through elongated slots 133 in the said plate. To insure that these mesh-supporting elements are always uppermost, the vibrator housings may also be provided at each side with a longitudinally extending shoe 134 engageable with the sub-grade to prevent the vibrators from rotating about their axes, as will be readily understood.

These adjustable mesh-supporting elements are of advantage not only in enabling the distance between the sub-grade and mesh to be increased or decreased uniformly across the slab, but also in securing uniformity of depth of the mesh below the upper surface of the slab regardless of variations in the thickness of the latter. For example, in many cases slabs are constructed which are thicker adjacent the forms F than in the center—usually accomplished by contouring of the sub-grade—and if in such instances the mesh-supporting members 131 of the side vibrators 98a and 98c be adjusted to occupy higher positions than the members 131 of the center vibrators 98b, uniform depth of the mesh below the slab surface may be attained.

What is claimed is:

1. In apparatus for constructing vibration-compacted concrete slabs: a frame provided with power driven means for advancing it intermittently over a slab bed; vibrating means including elements disposable upon the bed in spaced relation to said frame; and controllable connections between said power driven means and the vibrating means whereby said elements may be moved over the bed toward the frame.

2. In apparatus for constructing vibration-compacted concrete slabs: a mobile frame; drive means for moving said frame over a slab bed; vibrator means comprising a motive unit, a vibration element disposable upon the bed in spaced relation to the frame, and operating connections between said element and unit; means movably mounting said motive unit upon the frame; and means operable by said drive means to move the motive unit upon the frame and thereby draw the vibration element over the bed toward the frame.

3. In apparatus for constructing vibration-compacted concrete slabs: a mobile frame; drive means for moving said frame over a slab bed; a carriage mounted for movement upon the frame; vibrator means including a motive unit mounted on said carriage, a vibration element disposable upon the bed in spaced relation to the frame, and operating connections between said element and unit; and controllable connections between said drive means and the carriage whereby the latter may be moved upon the frame to draw the vibration element over the bed toward the frame.

4. In apparatus for constructing vibration-compacted concrete slabs: a mobile frame; drive means for moving said frame over a slab bed; a vibration element disposable upon the bed in horizontally spaced relation to the frame; means connectible to said drive means for moving said element over the bed toward the frame; and means for automatically disconnecting said element moving means from the drive means as the element approaches the frame.

5. In apparatus for constructing vibration-compacted concrete slabs: a mobile frame; drive means for moving said frame over a slab bed; a vibrator device including an element disposable upon the bed in horizontally spaced relation to the frame; reciprocatable means upon the frame connected to said device and operable by said drive means to move said vibrator element over the bed toward the frame; and means operable at the limits of travel of the reciprocatable means to disconnect it from the drive means.

6. In apparatus for constructing vibration-compacted concrete slabs: a mobile frame; drive means for moving said frame over a slab bed; a vibrator device reciprocatably mounted on the frame and having a vibration element disposable upon the bed in horizontally spaced relation to the frame; a shaft driven by said drive means; connections between said shaft and the vibrator device for moving the latter upon the frame to draw the vibration element over the bed toward the frame; and clutch means for controlling said connections.

7. In apparatus for constructing vibration-compacted concrete slabs: a mobile frame; drive means for moving said frame over a slab bed; a vibrator device reciprocatably mounted on the frame and having a vibration element disposable on the bed in horizontally spaced relation to the frame; chain and sprocket mechanism connected to said vibrator device for moving the latter upon the frame to draw the vibration element over the bed toward the frame; and reversible connections between said chain and sprocket mechanism and said drive means.

8. In apparatus for constructing vibration-compacted concrete slabs: a mobile frame comprising a plurality of separably connected units; a shaft common to all of said units, comprising separably connected sections carried by the units; means for driving said shaft; a vibrator device reciprocatably mounted upon each of said frame units and having a vibration element disposable upon the slab bed; and means for separately connecting and disconnecting said vibrator devices to and from said shaft whereby said devices may be independently moved upon the frame to cause travel of their vibration elements over the bed.

9. In apparatus for constructing vibration-compacted concrete slabs between spaced pre-set forms: a mobile frame provided with means whereby it may be intermittently moved over the slab bed; vibrating means disposable upon the bed in horizontally spaced relation to said frame; brake means engageable with the forms to intermittently restrain movement of the frame over the bed; means movably carried by the frame and connected to said vibrating means, for traversing the latter over the bed; and means for moving said traversing means upon the frame when the latter is stationary, to cause the vibrating means to approach the frame.

10. In a device for applying vibrations to a plastic concrete mixture, a substantially cylindrical vibrator housing adapted to rest upon a bed for the mixture; a member etxending upwardly from said housing for engaging and supporting a concrete reinforcing element; means connecting the member to the housing for vertical adjustment relative thereto, whereby the reinforcing element may be supported at various distances above the housing; and bed-engaging shoes carried by the housing for preventing turning of the housing on its axis.

ARTHUR E. MILLER.
GEORGE K. VIALL.
RUDOLPH F. LINDOW.

REFERENCES CITED

The following references are of record in the file of this patent:

UNITED STATES PATENTS

| Number | Name | Date |
|---|---|---|
| Re. 17,361 | McInerney | July 2, 1929 |
| 1,271,010 | Billington | July 2, 1918 |
| 1,533,085 | Arnett | Apr. 14, 1925 |
| 1,562,257 | Rogers | Nov. 17, 1925 |
| 1,571,527 | Rhodes | Feb. 2, 1926 |
| 1,760,350 | Edge | May 27, 1930 |
| 1,784,385 | Pelton | Dec. 9, 1930 |
| 1,969,884 | Heltzel | Aug. 14, 1934 |
| 2,031,901 | Mitchell | Feb. 25, 1936 |
| 2,056,100 | Hahn | Sept. 29, 1936 |
| 2,077,356 | Day | Apr. 13, 1937 |
| 2,138,103 | Jorgensen | Nov. 29, 1938 |
| 2,248,103 | Mallson | July 8, 1941 |
| 2,259,110 | Jackson | Oct. 14, 1941 |
| 2,303,335 | Day | Dec. 1, 1942 |